US010817505B2

(12) United States Patent
Tiwary et al.

(10) Patent No.: US 10,817,505 B2
(45) Date of Patent: Oct. 27, 2020

(54) MAINTAINING CONSISTENCY WITHIN A FEDERATED CLOUD ENVIRONMENT

(71) Applicant: SAP SE, Walldorf (DE)

(72) Inventors: Mayank Tiwary, Bengaluru (IN); Sabyasachi Dhal, Bengaluru (IN)

(73) Assignee: SAP SE, Walldorf (DE)

( * ) Notice: Subject to any disclaimer, the term of this patent is extended or adjusted under 35 U.S.C. 154(b) by 217 days.

(21) Appl. No.: 15/973,859

(22) Filed: May 8, 2018

(65) Prior Publication Data
US 2019/0347346 A1 Nov. 14, 2019

(51) Int. Cl.
G06F 16/23 (2019.01)
H04L 29/08 (2006.01)
H04L 29/06 (2006.01)
G06F 21/62 (2013.01)

(52) U.S. Cl.
CPC ...... *G06F 16/2365* (2019.01); *G06F 16/2343* (2019.01); *G06F 21/6227* (2013.01); *H04L 63/0876* (2013.01); *H04L 67/1095* (2013.01); *H04L 67/1097* (2013.01)

(58) Field of Classification Search
CPC ..... G06F 16/2365; G06F 17/30; H04W 12/08
See application file for complete search history.

(56) References Cited

U.S. PATENT DOCUMENTS

| | | | | |
|---|---|---|---|---|
| 9,817,958 | B1* | 11/2017 | McCorkendale | H04L 63/08 |
| 10,425,411 | B2* | 9/2019 | Huang | H04L 9/3268 |
| 2009/0288084 | A1* | 11/2009 | Astete | G06F 9/45558 718/1 |
| 2014/0365549 | A1* | 12/2014 | Jenkins | G06F 9/5077 709/201 |
| 2015/0100560 | A1* | 4/2015 | Davie | H04L 45/14 707/703 |
| 2015/0223068 | A1* | 8/2015 | Thelen | H04L 63/06 726/7 |
| 2015/0277969 | A1* | 10/2015 | Strauss | G06F 9/466 707/703 |
| 2015/0280959 | A1* | 10/2015 | Vincent | H04L 67/1097 709/203 |
| 2015/0295761 | A1* | 10/2015 | Wang | H04L 41/0806 709/222 |
| 2016/0210578 | A1* | 7/2016 | Raleigh | G06Q 20/20 |
| 2016/0371099 | A1* | 12/2016 | Woog | H04L 67/24 |
| 2017/0071015 | A1* | 3/2017 | Gervais | H04W 76/10 |
| 2019/0097838 | A1* | 3/2019 | Sahoo | H04L 45/745 |

(Continued)

*Primary Examiner* — Giovanna B Colan
(74) *Attorney, Agent, or Firm* — Buckley, Maschoff & Talwalkar LLC

(57) ABSTRACT

A method includes monitoring a user login to a computer network, receiving a media access control (MAC) address associated with a logged-in user, comparing the MAC address to a table that associates the MAC address with one or more queries to which the user has access, wherein the table comprises information associated with other users who are currently logged-in to the computer network, determining whether the user and at least one of the other currently logged-in users have common access to one or more queries, identifying the user and the at least one of the other currently logged-in users determined to have common access to one or more queries as conflicting users, and restricting write or modify queries through the network for the conflicting users.

17 Claims, 8 Drawing Sheets

(56) References Cited

U.S. PATENT DOCUMENTS

| | | | |
|---|---|---|---|
| 2019/0124001 A1* | 4/2019 | Miu | H04L 63/0876 |
| 2019/0251198 A1* | 8/2019 | Shamsutdinov | G06F 16/27 |
| 2019/0268398 A1* | 8/2019 | Suriarachchi | H04L 65/1003 |

* cited by examiner

MAINTAINING CONSISTENCY WITHIN A FEDERATED CLOUD ENVIRONMENT

BACKGROUND

In network-based data replication, the replication process occurs in the network, and thus the work is offloaded from the servers and storage arrays. For example, a storage area network (SAN) appliance or intelligent switch controls the replication. Therefore, network-based data replication can support a large number of server platforms and storage arrays.

Network-based data replication is ideal for heterogeneous storage environments where all write/modify queries from end-users hit all data centers simultaneously. For example, cloud-based enterprise resource planning (ERP) products may be used to serve a customer base which is distributed over distinct geographical locations. Such a deployment may include different instances of active ERP tenants serving data of more than one data center. Since write/modify queries are fired from end-users to all instances of ERP tenants, network-based data replication ensures data replication across anyone's array and supports any host platform.

However, network-based data replication may present problems with maintaining data consistency if multiple tenant instances are associated with a single customer. For example, if two end-users are connected to different tenant instances of a same customer and both end-users have access to write/modify queries for a same business object, then network-based data replication can lead to data inconsistency should two users request to change the same business object at the same point in time.

Therefore, improved systems are desired to maintain data consistency across data centers.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
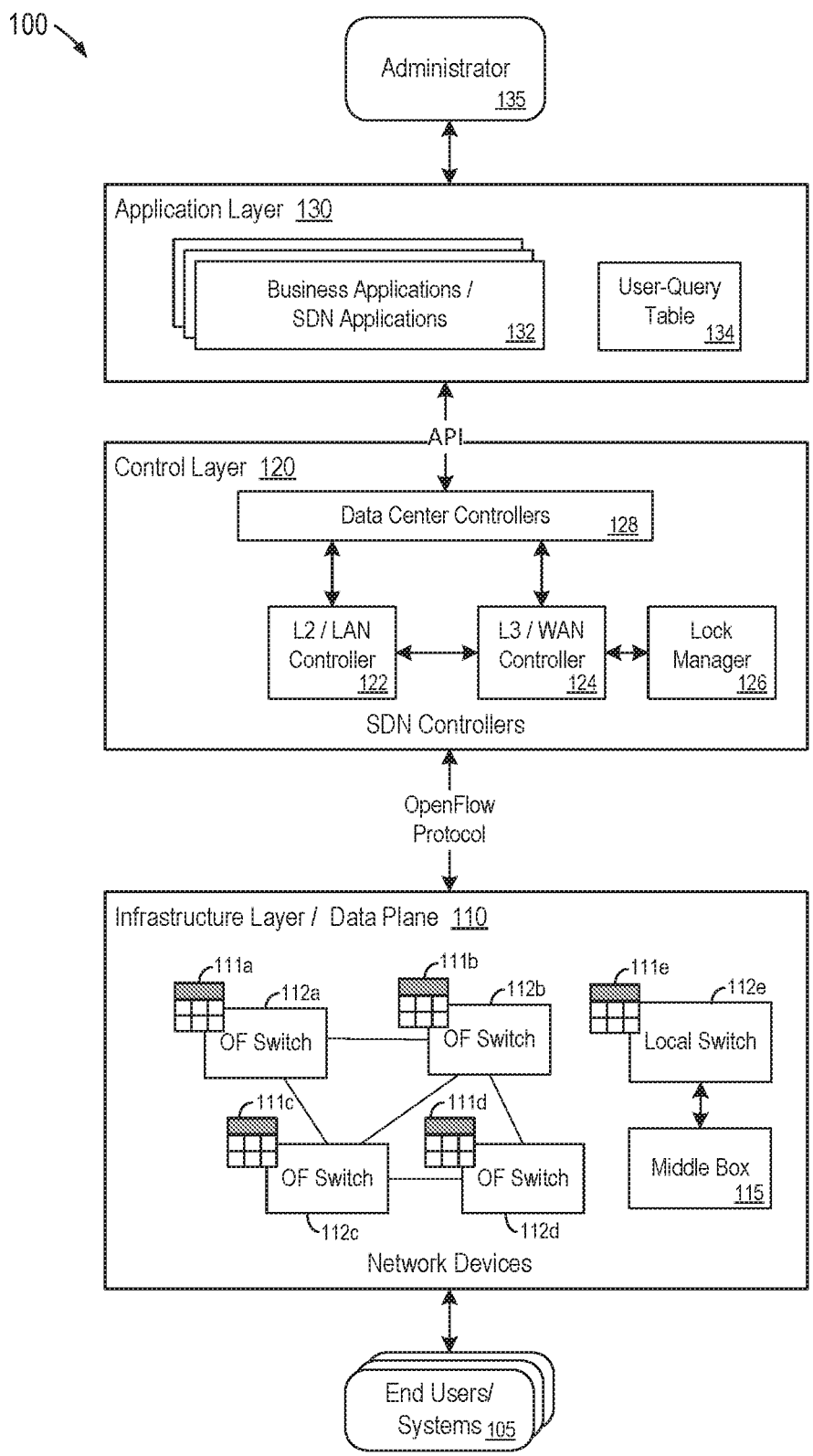
FIG. 1 is a block diagram of an overall system architecture according to some embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The disclosed embodiments relate to maintaining consistency in a federated cloud environment, and more specifically, maintaining data consistency for cloud-based products in a federated cloud environment using software-defined networking (SDN) technology. In one embodiment, data consistency is maintained using network control plane architecture instead of non-real-time techniques where data centers communicate using a wide area network (WAN) to maintain data consistency. In one example, in order to support data consistency, user login activities to a business application are monitored, and based on monitoring information, a locking mechanism is provided that enables only one user to send write or modify queries through a network at a time. The disclosed embodiments can be implemented with existing ERP modules or other database-based applications, and require minimal changes to front-end scripts.

In an embodiment, multiple systems and applications may be deployed in a cloud computing environment. Such systems and applications may be also referred to as cloud-based enterprise resource products that may be deployed in multiple geographically-distributed cloud computing environments. The computer system landscape includes a software-defined network of multiple integrated software components that may function in cooperation or independently. The software components in the computer system landscape may execute specific operations or functionalities, by working either in cooperation or independently. Coordination between the systems for managing access to resources (e.g., applications, systems, data structures, data, etc.) in the cloud computing environment may play a vital role in cooperative functioning of the applications and systems in the cloud computing environment.

The environments described herein are merely exemplary, and it is contemplated that the techniques described may be extended to other implementation contexts.

One or more embodiments that include one or more of the advantages discussed are described in detail below with reference to the figures.

Figure 2:
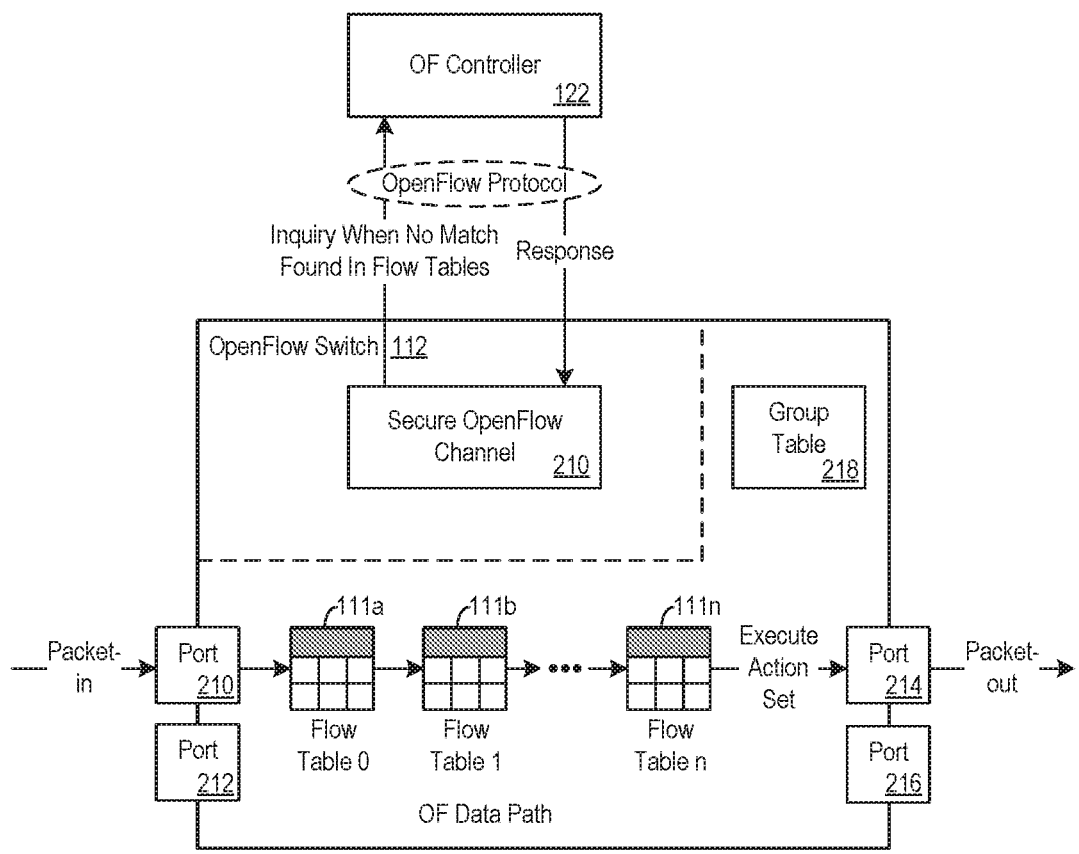
FIG. 2 is a more detailed block diagram of the system of FIG. 1 in which illustrative subcomponents of the system and their relationships to each other are shown.

FIGS. 1 and 2 will be discussed together. FIG. 1 is a block diagram of an overall system architecture 100 according to some embodiments. FIG. 2 is a more-detailed block diagram of the system of FIG. 1 in which illustrative subcomponents of the system and their relationships to each other are shown.

Architecture 100 (e.g., software-defined network (SDN)) includes several layers and generally provides an infrastructure layer 110 (e.g., data/forwarding plane), a control layer 120 (e.g., routing/control plane), and an application layer 130 (e.g., management/policy plane). In an SDN, the control layer (e.g., control functions) is separated from the infrastructure layer (e.g., data functions) and the control logic is moved to an external controller, with a control-to-data plane interface between them. Communication between the controller and the switches use a standardized protocol and API. In some embodiments, OpenFlow (e.g., forwarding protocol) is used for the interaction between the data plane 110 and the control plane 120. In this case, the switching devices 112a-e and controllers 122, 124 in the network support OpenFlow (OF). However, it is contemplated that other protocols may be used.

More specifically, the infrastructure layer 110 comprises network/switching devices 112a-e (e.g., switches and routers) interconnected through wired or wireless transmission medium (e.g., Ethernet cable, copper wire, fiber-optic, radio wave, etc.). In some embodiments, the infrastructure layer 110 also comprises a middle box deployed at a user site (e.g., local network switch 112e). The middle box 115 may store information related to tenants 132 deployed across multiple data centers, for example, that may be associated with a customer. Moreover, each switch may connect to end-user devices that are the sources and destinations of packet flows.

The network devices are configured to forward traffic to an external device or another switch. The network devices are configured to handle packets based on rules provided by a controller (e.g., packet forwarding). Packets are identified as belonging to flows (e.g., sequence of packets) based on match fields (e.g., switch ingress port, packet headers, metadata) detailed in a flow table (e.g., list of match criteria) and handled based on the flow to which they belong. In some embodiments, the network devices collect network status information (e.g., traffic statistics, network usage, etc.) and store a cache of the data before sending them to the controllers. Entries in the flow table are populated by a controller in the control layer, as described in more detail below.

The above network controllers, components, etc., may cooperatively work to monitor the user behavior, the queries generated from the users, etc., and may share the monitored information between different systems and components in the software-defined network.

In an embodiment, by way of a southbound interface between control layer 120 and the infrastructure layer 110, the control layer specifies rules for controllers to access the various functions provided by the networking devices in the infrastructure layer.

The control layer 120 comprises SDN controllers that manage traffic (e.g., network flows) by manipulating the flow tables (e.g., flow tables 111a-e) at network/switching devices in infrastructure plane 110. Generally, SDN controllers generate packet forwarding rules, analyze the rules, and forward the flow rules to appropriate networking devices for operation. The SDN architecture 100 can operate with different types of switches and at different protocols. For example, SDN controllers and switches of architecture 100 can be implemented for Ethernet switches (e.g., layer 2 switch) and Internet routers (e.g., layer 3 router). In some embodiments, the control layer 120 comprises a local area network (LAN) controller 122 (also referred to as "Layer 2 controller" or "L2 controller"), wide area network (WAN) controller 124 (also referred to as "Layer 3 controller" or "L3 controller"), lock manager 126, and data center controllers 128. The SDN controllers 122, 124 oversee the entire network from a central vantage point and define data flows that occur in SDN data plane 110, providing instructions to forwarding devices/switches in data plane 110 regarding the routing of packet traffic (e.g., drop, forward, modify, enqueue). Lock manager 126 communicatively coupled with controller 124 manages object locks, as described in more detail below with respect to FIGS. 6 and 7.

FIG. 2 illustrates some main components of a switch 112 in an OpenFlow (OF) network. Instructions are stored in flow tables which are used to manage the flows of packets through the switch. A flow table matches incoming packets to a particular flow and specifies the functions that are to be performed on the packets. Routers and switches in infrastructure layer 110 the flow tables to dispatch packets to their egress ports 214, 216. For example, OF switch 112 contains one or more flow tables 111a, 111b, 111c, . . . , 111n, each of which hold flow entries. Flow entries let the switch know what to do when similar packets arrive at the switch based on matching fields. Each packet (e.g., packet-in) that enters the switch (e.g., via a switch ingress port 210, 212) passes through one or more flow tables. Additionally, the OF switch 112 comprises one or more secure OpenFlow channels 210, 220 for the connection to one or more OF controllers 122, 124 (e.g., via OpenFlow protocol).

Components of a flow entry include match fields (e.g., used to select packets that match the values in the fields; may include ingress port, packet headers and/or metadata specified by a previous table), priority (e.g., indicating a relative priority of flow entries), counters/timers (e.g., updated when packets are matched, such as the number of received bytes and packets (per port, per flow table, per flow table entry, etc.), the number of dropped packets, and the duration of a flow), instructions/actions (e.g., actions to be taken if a match occurs), and/or timeouts (e.g., maximum amount of time or idle time before a flow is expired by the switch).

When a packet arrives at a switch 112 (e.g., a switch ingress port 210), the switch searches for matching flow entries in the flow tables. The header fields of the packet are matched against flow entries of a flow table 111a. In some embodiments, within each switch, where there are multiple tables 111a, 111b, 111c, . . . , 111n that operate in a pipeline fashion, matching starts at a first table 111a and proceeds to the consecutive tables 111b, 111c, . . . , 111n. In some embodiments, a flow table may direct a flow to a group table 218, which may trigger a variety of actions that affect one or more flows. If there are any entry matches, the indicated actions (e.g., instruction set) in that flow entry are executed/performed and counters indicated in that entry are updated. In some embodiments, entries have priorities and the highest priority match succeeds.

When no match is found in the flow tables, also known as a "table-miss," in one embodiment, the switch contacts the controller (e.g., inquiry event sent to OF controller) and the packets may be passed/punted up to the controller 112. For example, the switch 112 will send an asynchronous message (also known as "packet-in", which includes the user's MAC address) with a packet header to controller. The controller may respond with a new flow entry for handling the packet. For example, after the controller receives the packet-in message, the controller may send a packet-out message back to the switch in response to update the forwarding table in the device, indicating what to do with a specific packet. In another embodiment, the controller may send a flow modification message that instructs the switch to add a new flow entry in its flow tables. The controllers, by way of the messages, can perform add, update, and/or delete actions to the flow entries in the flow/forwarding table in a router or switch.

In some embodiments, the switch can drop packets on a particular flow as dictated by the controller (e.g., for security purposes or traffic management). When a switch sends a packet to the controller and the controller decides not to drop the packet but to direct it to a switch output port, a packet-out message is used to direct/forward the incoming packet out to the specified port on the switch (e.g., port 214). The switch forwards incoming packets out of the appropriate port based on the flow table.

The application layer 130 comprises applications (e.g., business applications, SDN applications 132) and a user-query table 134 (also referred to as "query table"). In an embodiment, a tenant (e.g., enterprise resource planning (ERP) tenant) may represent an application or system that may be deployed in the cloud computing environment. Multiple tenants may be deployed in the cloud computing environment and end user(s) 105 may log on to the tenants and execute the functionalities or operations.

In an embodiment, user(s) 105 may log on to the tenants 132 and execute or generate queries (e.g., structured query language (SQL) queries) to execute specific functionalities or operations. The initiation of requests for executing operations or functionalities may be via a generation of queries that may contribute to network traffic (e.g., data).

In an embodiment, application logic may be deployed or implemented at L2 controllers 122 and/or L3 controllers 124.

Figure 3:
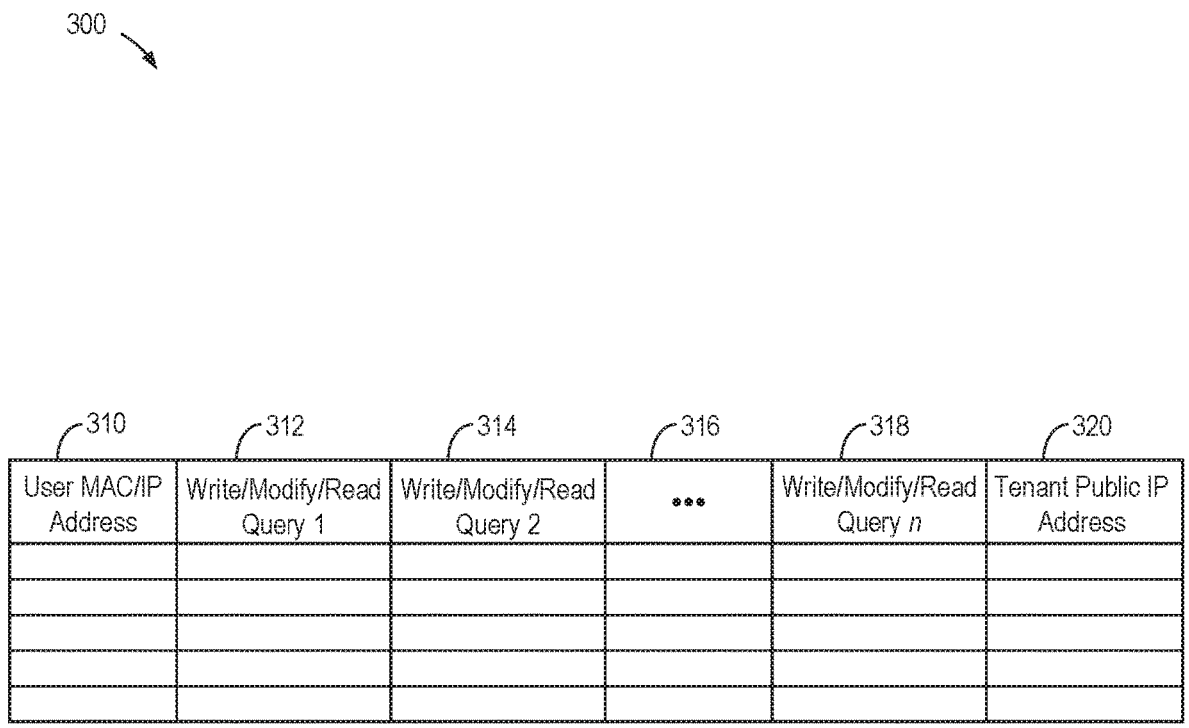
FIG. 3 is a table illustrating example of user-query table according to some embodiments.

FIG. 3 is a table 300 illustrating example of user-query table 134 according to some embodiments. More specifically, FIG. 3 shows a data structure storing attributes or parameters associated with users, according to an embodiment. FIG. 3 shows a data structure (e.g., a table) that may be deployed in the cloud computing environment and be communicatively coupled with the controllers (e.g., L2 controllers, L3 controllers, etc.). In an embodiment, the table (also referred to as "user-query table") may include columns representing the attributes or parameters and a corresponding value of the attributes or the parameters associated with the users. For example, such attributes or parameters and the corresponding values may include a user system's media access control (MAC) address or internet protocol (IP) address 310. The attributes or parameters stored in the table may further include information associated with the type of queries 312, 314, 316, 318 that may be generated by the users. For example, such queries may execute operations related to write, update, modify, or read. The attributes stored in the table may also include public IP addresses of all active tenants 320 deployed in the cloud computing environment.

In an embodiment, the deployment of the tenants may be geographically distributed. The controllers (e.g., L2 controllers, L3 controllers, data center controllers, etc.) may refer to the table and determine a list of users that may generate conflicting queries. For example, when multiple users generate or execute multiple write and/or modify and/or update queries that may be executed on a specific or same tenant, the WAN controller may determine that the users may be in conflict. In such a scenario, the LAN controller and the WAN controller may multicast traffic user's MAC address/IP address and Tenant IP addresses. In some embodiments, the user-query table 134 is generated by a network/system administrator 135 based on associated backend tables (e.g., registered users are assigned a user ID and password, which are mapped to a MAC address of the user's device through which they access an ERP) and stored in a virtual machine running in a data center. In some embodiments, the user-query table 134 may be maintained by ERP tenants and used by L2 and L3 controllers. Using this table, the controller may fetch the conflicting users (e.g., set of users having access to the same write/modify queries). The L2 and L3 controllers can then perform multicasting based on the user's MAC/IP and tenant IP addresses.

Figure 4:
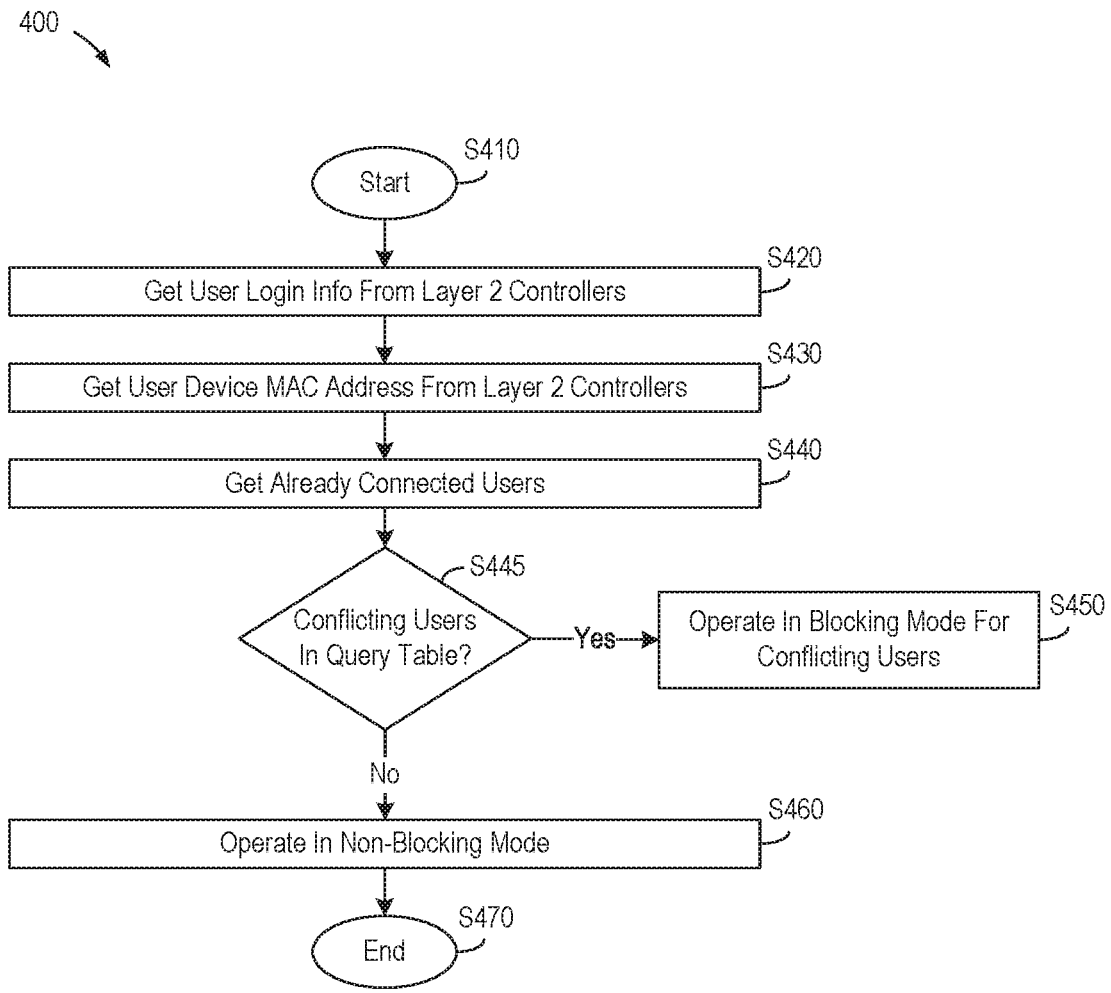
FIG. 4 is a flow diagram illustrating an exemplary process according to some embodiments.

FIG. 4 is a flow diagram illustrating an exemplary process 400 of admission control of users according to some embodiment. In an embodiment, process 400 shows a mechanism for determining admission of users (e.g., determining whether or not to block the users) when conflicting queries are generated or executed by the users. At S410, when a user logs on to a tenant, a flow entry is created for a tenant and a user. This entry may include information of user (e.g., user name, user credentials, etc.), the tenant, information on the type of queries, etc. At S420, this information may be created and stored in a flow table that may be communicatively coupled with the L2 controller. At S430, the L2 controller may replicate or inform the L3 controller on the information corresponding to the user and the tenant. In an embodiment, at S440, the L3 controller may also store information of all active users (e.g., active users connected to the tenants on the network). The L3 controller may be configured to determine or check for queries generated or executed by the users. The queries may be related to execution of operations, for example, write and/or modify operations, etc. For example, the L3 controller may obtain a user device MAC address from the L2 controller. Further, based on the obtained MAC address of the user 310 from the packet-in, and using a user-query table 300 as shown in FIG. 3, the L3 controller can determine all the users who have logged into the system and that have access to same write and/or modify queries. At S445, the L3 controller may also be configured to determine conflicts (e.g., having access to same write and/or modify queries) with already connected users via user-query table 300. When the L3 controller determines that there is a conflict between users (e.g., conflicting users), the L3 controller may initiate a mechanism to block the users at S450, thereby preventing the users from further accessing or executing operations on the tenants on the network (e.g., locking system is implemented). When it is determined that there are no conflicts between users, the system operates in normal, non-blocking mode at S460. For example, if no conflicting users are found, then the system enables users to perform normal cloud-based ERP operations through middle boxes. The process ends at S470.

Figure 5:
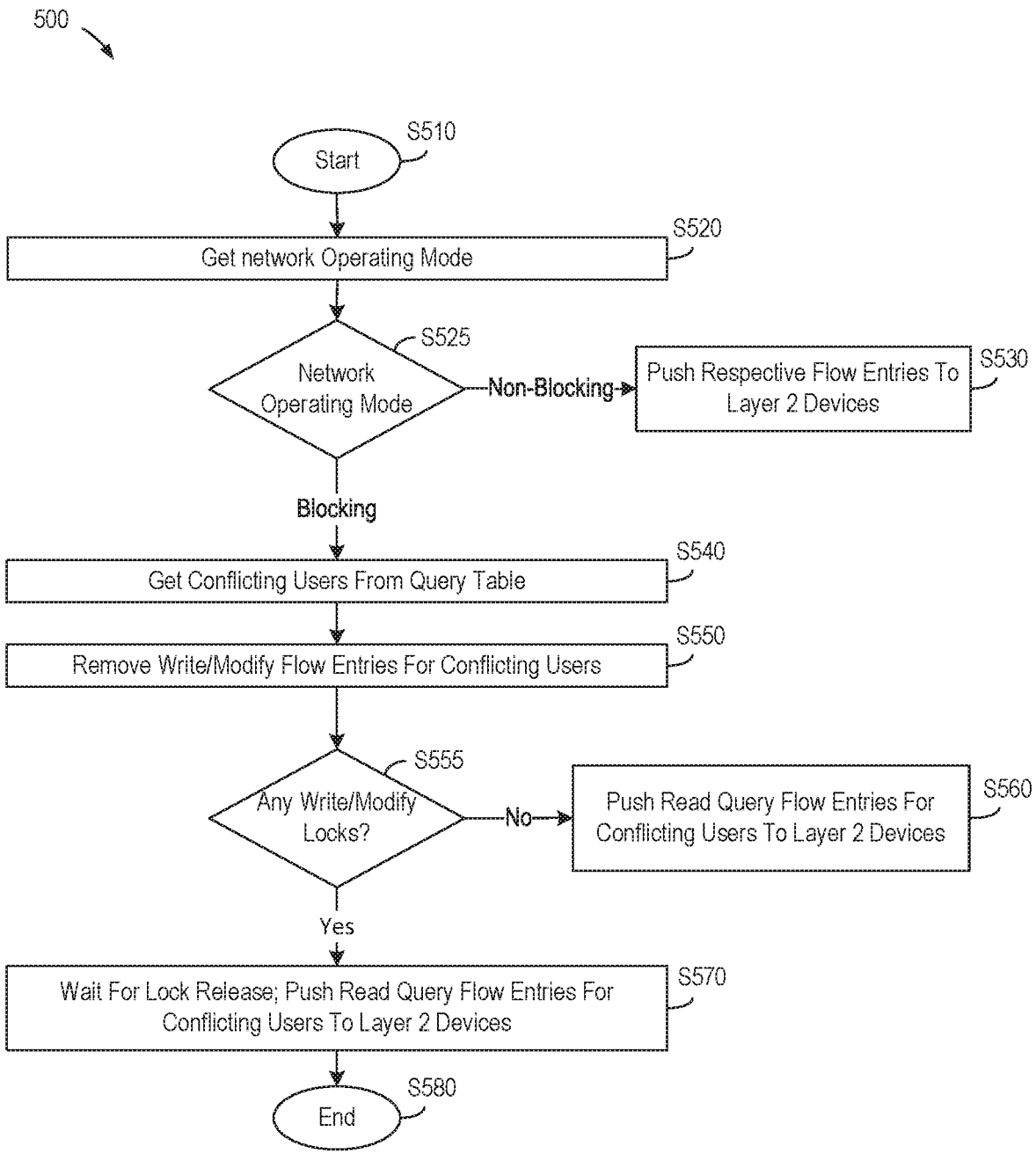
FIG. 5 is a flow diagram illustrating an exemplary process according to some embodiments.

FIG. 5 is a flow diagram illustrating an exemplary process 500 for executing operations or functionalities on a network in blocking mode and non-blocking mode, beginning at S510, according to some embodiments. Initially, at S520, a network operating mode is obtained. When the L3 controller determines that there are no conflicts between users at S525, the network may operate in a normal mode. For example, such a mode of operation may also be referred to as a non-blocking mode. When the network operates in non-blocking mode, all the users who are logged onto the network (e.g., via corresponding ERP tenants) may generate or execute queries, for example, read and/or write and/or modify operations. Such queries may be pushed to the respective OpenFlow devices at S530. On the other hand, when the L3 controller determines a conflict between the users at S525, the conflicting users are obtained from the query table 300 at S540 and the L3 controller may initiate a mechanism to block the conflicting users from using or executing operations on the network. When such a mechanism for blocking the users is active, the write and/or modify queries may be removed from the respective OpenFlow devices at S550. In an embodiment, the write and/or modify queries associated with the conflicting users may be processed only when the user gets access to an object lock at S555 (e.g., each object lock may be associated with corresponding data object or data). The object lock may provide a mechanism for locking data object(s) for a predetermined period of time. The lock is an exclusive lock that blocks other users from writing or modifying data associated with a corresponding data object. When the object is locked for the predetermined period of time, queries related to read operations may not be executed. The access to or for reading data (e.g., flow entries) by the users, when the network is in blocking mode, may be provided to the users at S560 only when there is no object lock on the data object(s) at S555. When there is an object lock on the data object(s) at S555, access to or for reading data by the users may be provided to the users, when the network is in blocking mode after lock release at S570 (e.g., a predetermined period of time). The process ends at S580.

More generally, when a user logs onto the network, a flow entry is pushed to the switches and routers on the network. The L2 controller asynchronously sends such information about the flow entries to the L3 controller. In an embodiment, the L3 controller may verify or perform checks to determine any conflicting users and either allow the users to further access the network (e.g., non-blocking mode) or may initiate the mechanism for blocking the users.

In some embodiments, the L2 controller may periodically monitor the user flow entries using FLOW_STATS. When the L2 controller determines that the count of data packets for a corresponding flow entry is much less that a predetermined threshold value, then the L2 controller may delete the corresponding flow entries and share this information with the L3 controller. In such a scenario, the L2 controller may determine that the user may have logged off from the network and/or the tenant.

Figure 6:
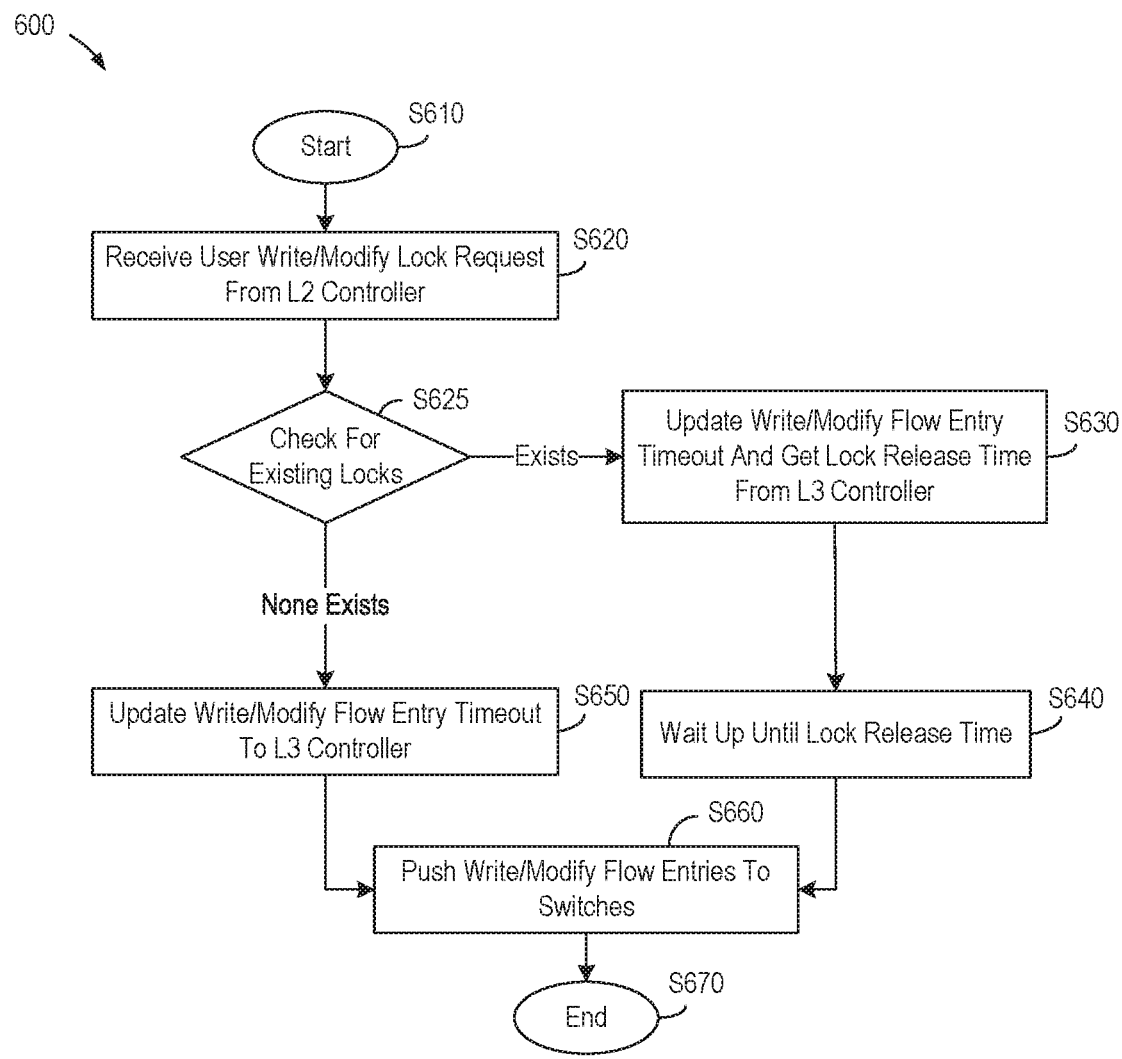
FIG. 6 is a flow diagram illustrating an exemplary process according to some embodiments.

FIG. 6 is a flow diagram illustrating an exemplary process 600 for acquiring a lock on a data object by an L2 controller, beginning at S610, according to some embodiments. In an embodiment, when the user logs on to the network from a local network, a flow entry may be created and stored in a table associated with the L2 controller. Each flow entry in the user flow entries table is associated with a predetermined timeout value. Such a timeout value may be configured or modified by a system administrator managing the network operations. In an embodiment, the timeout value may also be determined from historic information of the user behavior on the network or the timeout value may be determined by network and/or Internet bandwidth. Once the timeout value for a flow entry has expired or elapsed, the corresponding flow entry may be removed from the flow table. For example, the queries executing operations related to write and/or modify, may typically include 10-20 data packets and a typical timeout value of 20-30 milliseconds (ms). In an embodiment, the L3 controller may maintain a lock timer associated with a lock object. The lock timer may correspond to the time for which lock (e.g., locking data object) is enabled. The lock timer may be updated with the value of times out corresponding to the write and/or modify queries, once the corresponding lock object is released.

In an embodiment, at S620, the L3 controller may receive a request to lock data object(s) from the L2 controller. For instance, when the network is in blocking mode, the Open-Flow devices do not execute operations or queries related to write and/or modify queries. In an embodiment, when the user generates or executes write and/or modify queries, OpenFlow device generates a PACKET_IN and sends it to L2 controller. Subsequent to such an operation, the L2 controller may seek a lock object from the L3 controller. The L3 controller may check for existing locks at S625. When the L3 controller determines an existence of lock, at S630, the L2 controller may update the L3 controller with the timeout value for a new flow entry, which will be pushed to the flow table once the existing lock is released at S640. In an embodiment, the L3 controller may send information including a total time for the lock to be released based on timeout values of the existing flow entries. After an elapse in the total time, the L2 controller pushes the flow entries to the OpenFlow devices. In an embodiment, when the L3 controller determines that no locks exist, at S650, the L2 controller updates the L3 controller with the timeout value for the new flow entry, which will be pushed to the flow table at S650. At S660, upon updating the timeout value for the new flow entry, the L2 controller may push the entries associated with write and/or modify queries to Layer 2 OpenFlow devices (e.g., switches). In an embodiment, based on the timeout value, the L3 controller may remove the queries related to read operations from the Layer 2 devices, when the L3 controller determines conflicting user. The process ends at S670.

In an example use case of a user "X" logging in from a local network (e.g., office location), user "X" may be connected to a switch "S." L3 controller "L3C" may manage all the routers in the Internet layer. L2 controller "L2C" may manage all the switches including switch "S." When switch "S" has a flow table "F," switch "S" uses the data from the flow table to perform traffic forwarding. A flow rule may include, for example, a source address, a destination address, a source port, a destination port, and action(s) such as: Src Addr=X's Addr, Dest Addr=ERP's IP Addr, Src Port=80, Dest Port=80, Action=forward to root port 10.

For any network packet received by the switch "S" which has a matching source address, destination address, source port, and destination port, the indicated action(s) are executed/performed. On the other hand, if a rule is not maintained in the flow table "F" of switch "S," the packet or set of packets will be stored in the switch buffer and switch "S" generates a control request (also referred to as "packet-in") to "L2C." "L2C" can extract the MAC address of user "X" from the received packet-in and reference a user-query table (e.g. as shown in FIG. 3). Based on the queries assigned to the user (e.g., for which users have access), "L2C" can identify any conflicting users (from the set of already logged-in users). The "L2C" comprises logic which runs and generates a new rule (also referred to as "packet-out") which is sent/pushed from "L2C" to "S." Once "S" adds the new rule received from "L2C" to "F", then the initial packet which was stored in the buffer will be forwarded.

In an example use case where there are some conflicting users found and the common query is "Q", "L2C" informs the ERP about all conflicting users. The ERP's front end notifies the users front end script to fire any traffic for "Q" from "X" to destination port "P." When "X" fires traffic for "Q," for example: Src Addr=X's Addr, Dest Addr=ERP's IP Addr, Src Port=80, Dest Port=P, Action=forward to root port 10, and there are not rules maintained in the flow table "F" of switch "S", "S" will generate a packet-in to "L2C" for the traffic fired from "X" (for query "Q"). Both controllers L2C and L3C will know when they receive a packet-in where the destination port parameter for packet is "P," that the traffic for which packet-in is generated requires to be granted a lock before "L2C" replies to "S" with a packet-out to add the rule in flow table "F" to switch "S." Thus, "L2C" generates a lock request to "L3C." If "L3C" has not granted a lock to any other user, "L3C" grants the lock to "L2C." Next, "L2C" sends out a packet-out to add the following rule in flow table "F" of switch "S": Src Addr=X's Addr, Dest Addr=ERP's IP Addr, Src Port=80, Dest Port=80, Action=forward to root port 10.

Thereafter, user "X" can perform normal transaction and its traffic will be forwarded to the Internet router through the root port of "S." Also, as "L3C" grants the lock to "L2C," "L3C" is also aware of the flow time for "Q." For example, when user "X" fires query "Q" to ERP, X's system may generate 30 packets. The overall response time for 30 packets may be a maximum of 100 ms. Therefore, "L3C" will update the lock timer to 100 ms after which the lock is automatically released.

Figure 7:
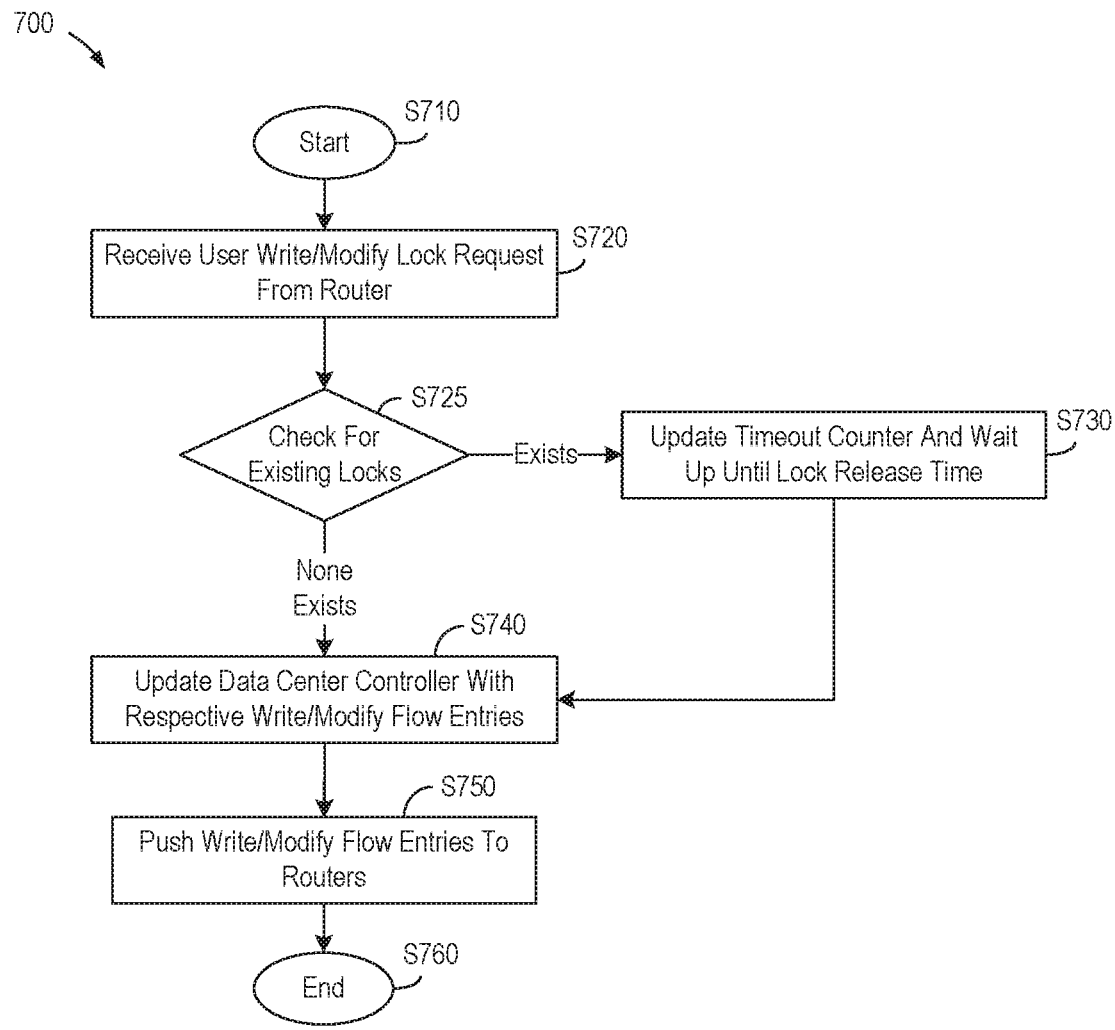
FIG. 7 is a flow diagram illustrating an exemplary process according to some embodiments.

FIG. 7 is a flow diagram illustrating an exemplary process 700 for acquiring a lock on a data object by L3 controller, beginning at S710, according to some embodiments. In an embodiment, when the user logs into the cloud computing environment from an external network (e.g., from home, using the Internet), the user traffic flows (e.g., requests, queries, operations, etc.) are controlled by L3 OpenFlow routers. At S720, when the user executes or generates a write/modify query, the L3 OpenFlow router generates a PACKET_IN and sends it to L3 controller. In an embodiment, the L3 controller, at S725, upon receiving PACKET_IN may determine the existence of lock object. When the lock objects exists, at S725, the L3 controller may update the lock timeout value and waits for an elapse in the lock timeout at S730. Upon elapse in the lock timeout value, the L3 controller notifies the data center controllers on the corresponding flow entries at S740. In an embodiment, this information may be used to authenticate the flow entries from end users in multiple data centers. Subsequently, at S750, the L3 controller pushes the flow entries to the OpenFlow routers. When the L3 controller determines the absence of lock objects at S725, the L3 controller may notify the data center controllers on the corresponding flow entries at S740. This information may be used to authenticate the flow entries from end users in multiple data centers. At S750, the L3 controller may subsequently push the respective flow entries to the OpenFlow devices (e.g., routers). The process ends at S760.

Figure 8:
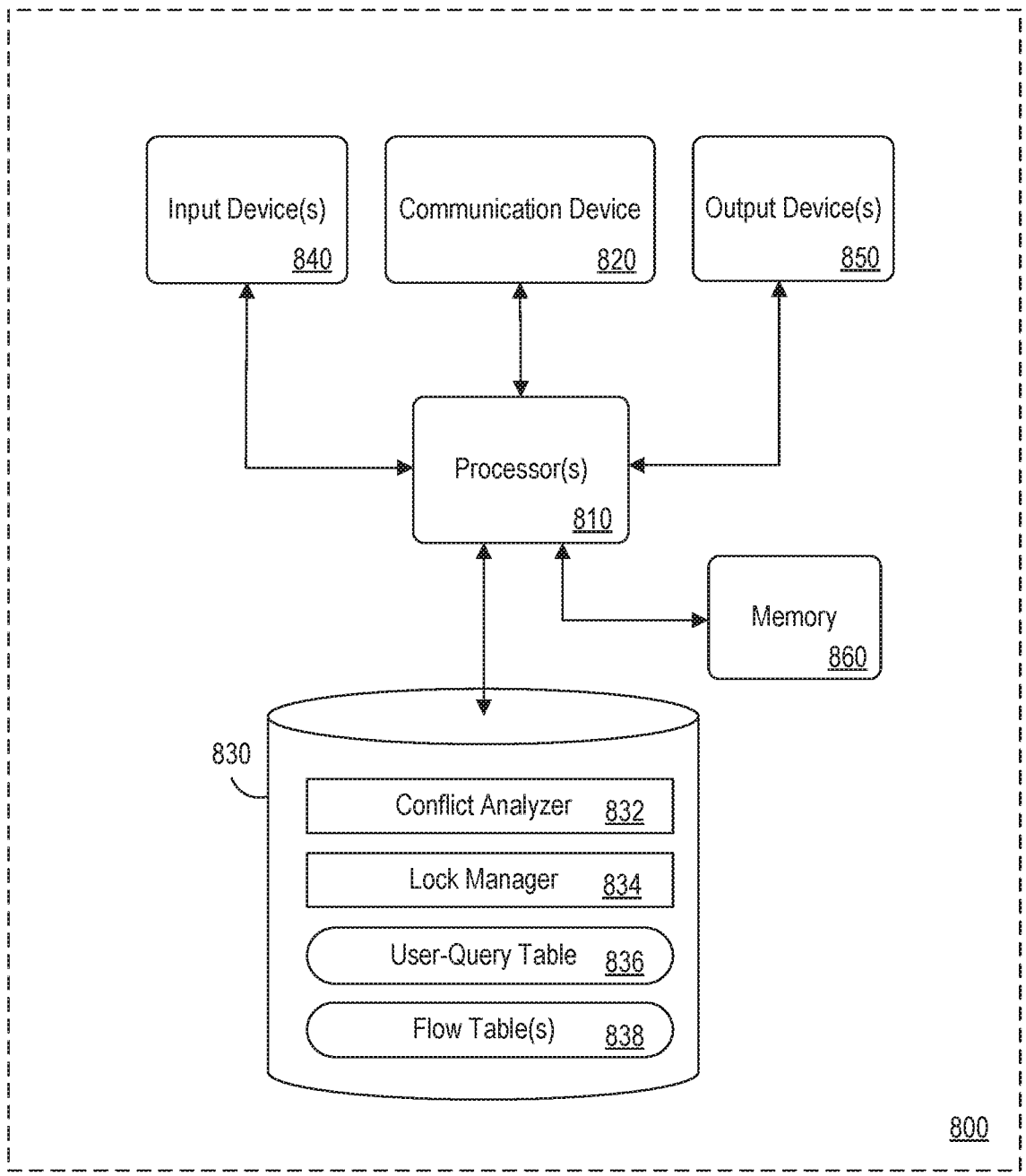
FIG. 8 is a block diagram of an apparatus according to some embodiments.

FIG. 8 is a block diagram of apparatus 800 according to some embodiments. Apparatus 800 may comprise a general- or special-purpose computing apparatus and may execute program code to perform any of the functions described herein. Apparatus 800 may comprise an implementation of one or more elements of architecture 100. Apparatus 800 may include other unshown elements according to some embodiments.

Apparatus 800 includes processor 810 operatively coupled to communication device 820, data storage device 830, one or more input devices 840, one or more output devices 850, and memory 860. Communication device 820 may facilitate communication with external devices, such as a conflict analyzer 832. Input device(s) 840 may comprise, for example, a keyboard, a keypad, a mouse or other pointing device, a microphone, knob or a switch, an infrared (IR) port, a docking station, and/or a touch screen. Input device(s) 840 may be used, for example, to manipulate graphical user interfaces and to input information into apparatus 800. Output device(s) 850 may comprise, for example, a display (e.g., a display screen), a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM).

Conflict analyzer 832 and lock manager 834 may comprise program code executed by processor 810 to cause apparatus 800 to perform any one or more of the processes described herein. Embodiments are not limited to execution of these processes by a single apparatus.

User-query table 836 and flow table(s) 838 (either cached or a full database) may be stored in volatile memory such as memory 860. Data storage device 830 may also store data and other program code for providing additional functionality and/or which are necessary for operation of apparatus 800, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A method for data communication in a software-defined network, the method comprising:
monitoring a user login to a computer network;
receiving a media access control (MAC) address associated with a logged-in user;
comparing the MAC address to a query table that associates the MAC address with one or more queries to which the user has access, wherein the query table comprises information associated with other users who are currently logged-in to the computer network;
determining whether the user and at least one of the other currently logged-in users have common access to one or more queries;
identifying the user and the at least one of the other currently logged-in users determined to have common access to one or more queries as conflicting users;
determining, based on the query table, a list of the conflicting users, wherein the list is different from the query table;
restricting write or modify queries through the network for the conflicting users;

removing write or modify software-defined data flow entries for the conflicting users from a flow table of an associated switching device;

determining whether one of the conflicting users has obtained a lock for writing or modifying data associated with a corresponding data object, wherein the lock is released after a predetermined period of time;

waiting for the lock to be released after the predetermined period of time; and when no locks have been obtained, or after the lock is released, allowing queries associated with read operations to execute.

2. The method of claim 1, wherein the query table associates a user's MAC address with one or more reading, writing, and modifying operations on the computer network to which the user has access.

3. The method of claim 1, wherein the lock is an exclusive lock that blocks other users from writing or modifying data associated with a corresponding data object.

4. The method of claim 1, further comprising:

receiving, by a logical controller, a request to lock a data object;

determining whether the lock associated with the data object has been granted;

updating a timeout value for a software-defined data flow entry, wherein the flow entry is pushed to one or more associated data forwarding devices when the lock is released;

obtaining a predetermined time interval after which the lock is released;

when the lock has been granted, waiting for the lock to be released after the predetermined time interval; and pushing the flow entry to the associated data forwarding devices.

5. The method of claim 4, wherein the software-defined network is an OpenFlow-enabled network.

6. The method of claim 4, wherein the data forwarding devices comprise OpenFlow-enabled switches and routers.

7. A system comprising:

a processor; and a memory in communication with the processor, the memory storing program instructions, the processor operative with the program instructions to perform the operations of:

monitoring a user login to a computer network;

receiving a media access control (MAC) address associated with a logged-in user;

comparing the MAC address to a query table that associates the MAC address with one or more queries to which the user has access, wherein the query table comprises information associated with other users who are currently logged-in to the computer network;

determining whether the user and at least one of the other logged-in users have common access to one or more queries;

identifying the user and the at least one of the other currently logged-in users determined to have common access to one or more queries as conflicting users;

determining, based on a query table, a list of the conflicting users, wherein the list is different from the query table;

restricting write or modify queries through the network for the conflicting users;

removing write or modify software-defined data flow entries for the conflicting users from a flow table of an associated switching device;

determining whether one of the conflicting users has obtained a lock for writing or modifying data associated with a corresponding data object, wherein the lock is released after a predetermined period of time;

waiting for the lock to be released after the predetermined period of time; and when no locks have been obtained, or after the lock is released, allowing queries associated with read operations to execute.

8. The system of claim 7, wherein the query table associates a user's MAC address with one or more reading, writing, and modifying operations on the computer network to which the user has access.

9. The system of claim 7, wherein the lock is an exclusive lock that blocks other users from writing or modifying data associated with a corresponding data object.

10. The system of claim 7, further comprising:

receiving, by a logical controller, a request to lock a data object;

determining whether the lock associated with the data object has been granted;

updating a timeout value for a software-defined data flow entry, wherein the flow entry is pushed to one or more associated data forwarding devices when the lock is released;

obtaining a predetermined time interval after which the lock is released;

when the lock has been granted, waiting for the lock to be released after the predetermined time interval; and pushing the flow entry to the associated data forwarding devices.

11. The system of claim 10, wherein the software-defined network is an OpenFlow-enabled network.

12. The system of claim 10, wherein the data forwarding devices comprise OpenFlow-enabled switches and routers.

13. A non-transitory computer readable medium having stored therein instructions that when executed cause a computer to perform a method comprising:

monitoring a user login to a computer network;

receiving a media access control (MAC) address associated with a logged-in user;

comparing the MAC address to a query table that associates the MAC address with one or more queries to which the user has access, wherein the query table comprises information associated with other users who are currently logged-in to the computer network;

determining whether the user and at least one of the other currently logged-in users have common access to one or more queries;

determining, based on the query table, a list of the conflicting users, wherein the list is different from the query table;

identifying the user and the at least one of the other currently logged-in users determined to have common access to one or more queries as conflicting users;

restricting write or modify queries through the network for the conflicting users;

removing write or modify software-defined data flow entries for the conflicting users from a flow table of an associated switching device;

determining whether one of the conflicting users has obtained a lock for writing or modifying data associated with a corresponding data object, wherein the lock is released after a predetermined period of time;

waiting for the lock to be released after the predetermined period of time; and when no locks have been obtained, or after the lock is released, allowing queries associated with read operations to execute.

14. The non-transitory computer-readable medium of claim 13, wherein the query table associates a user's MAC address with one or more reading, writing, and modifying operations on the computer network to which the user has access.

15. The non-transitory computer-readable medium of claim 13, wherein the lock is an exclusive lock that blocks other users from writing or modifying data associated with a corresponding data object.

16. The non-transitory computer-readable medium of claim 13, the method further comprising:

receiving, by a logical controller, a request to lock a data object;

determining whether the lock associated with the data object has been granted;

updating a timeout value for a software-defined data flow entry, wherein the flow entry is pushed to one or more associated data forwarding devices when the lock is released;

obtaining a predetermined time interval after which the lock is released;

when the lock has been granted, waiting for the lock to be released after the predetermined time interval; and pushing the flow entry to the associated data forwarding devices.

17. The non-transitory computer-readable medium of claim 16, wherein the software-defined network is an OpenFlow-enabled network.

* * * * *